US 8,047,461 B1

(12) United States Patent
Slawson

(10) Patent No.: US 8,047,461 B1
(45) Date of Patent: Nov. 1, 2011

(54) FISHING REEL RE-WINDER

(76) Inventor: Wayne G. Slawson, Fort McMurray (CA)

( * ) Notice: Subject to any disclaimer, the term of this patent is extended or adjusted under 35 U.S.C. 154(b) by 0 days.

(21) Appl. No.: 12/454,096

(22) Filed: May 12, 2009

Related U.S. Application Data

(60) Provisional application No. 61/127,122, filed on May 12, 2008.

(51) Int. Cl.
*A01K 89/01* (2006.01)

(52) U.S. Cl. ..... 242/257; 242/227; 242/250; 242/597.4; 43/21

(58) Field of Classification Search ............... 242/323, 242/225–227, 250, 251, 257, 902, 597.1, 242/597.4, 597.7, 597.8; 43/21
See application file for complete search history.

(56) References Cited

U.S. PATENT DOCUMENTS

| | | | | |
|---|---|---|---|---|
| 2,896,354 A * | 7/1959 | Reed et al. | | 43/21 |
| 2,896,875 A * | 7/1959 | Reed et al. | | 242/225 |
| 3,294,337 A * | 12/1966 | Jacob | | 242/575.2 |
| 3,596,846 A * | 8/1971 | Johnston | | 242/597.3 |
| 3,638,878 A * | 2/1972 | Morris | | 242/129.8 |
| 3,784,125 A * | 1/1974 | Law et al. | | 242/387 |
| 3,973,741 A * | 8/1976 | Dean | | 242/404.2 |
| 4,196,864 A * | 4/1980 | Cole | | 242/608.5 |
| 4,951,890 A * | 8/1990 | Sossamon | | 242/486.8 |
| 4,991,785 A * | 2/1991 | Kuo et al. | | 242/597.1 |
| 5,004,181 A | 4/1991 | Fowles | | |
| 5,071,085 A * | 12/1991 | Beers | | 242/390.8 |
| 5,322,236 A | 6/1994 | Smith | | |
| 5,394,815 A * | 3/1995 | Hansen | | 114/109 |
| 5,400,979 A * | 3/1995 | Goodman | | 242/225 |
| 5,524,843 A * | 6/1996 | McCauley | | 242/532.6 |
| D376,190 S | 12/1996 | Van Horn, Jr. et al. | | |
| 5,695,140 A * | 12/1997 | Goodman | | 242/250 |
| 5,947,790 A * | 9/1999 | Gordon | | 446/247 |
| 5,988,547 A * | 11/1999 | Koelewyn | | 242/246 |
| 6,015,111 A * | 1/2000 | Berke | | 242/394 |
| 6,029,391 A * | 2/2000 | Holley et al. | | 43/43.11 |
| 6,065,699 A * | 5/2000 | Sacconi | | 242/286 |
| 6,102,319 A * | 8/2000 | Annabel et al. | | 242/362 |
| 6,126,104 A | 10/2000 | Kellerman | | |
| 6,286,772 B1 * | 9/2001 | Koelewyn | | 242/246 |
| 6,286,779 B1 * | 9/2001 | Devine | | 242/532 |
| 6,467,716 B1 * | 10/2002 | Hamilton | | 242/394 |
| 6,550,712 B1 * | 4/2003 | Peterpaul | | 242/390.8 |
| 6,609,673 B1 * | 8/2003 | Johnson | | 242/423.1 |
| 6,648,262 B1 * | 11/2003 | Huffman | | 242/390.8 |
| 6,685,125 B1 * | 2/2004 | Tucci | | 242/390.8 |
| 6,702,226 B1 * | 3/2004 | Bowling | | 242/597.4 |
| 6,834,459 B2 | 12/2004 | van Weenen | | |
| 7,073,740 B2 * | 7/2006 | Westhoff | | 242/225 |
| 7,086,622 B1 | 8/2006 | Whaley | | |
| 7,309,039 B1 * | 12/2007 | Stone | | 242/225 |
| 7,374,124 B2 * | 5/2008 | Engelsher | | 242/390.8 |

(Continued)

*Primary Examiner* — Emmanuel M Marcelo
(74) *Attorney, Agent, or Firm* — Montgomery Patent & Design; Robert C Montgomery; Joseph T. Yaksich

(57) ABSTRACT

A device for the quick removal of spent fishing line from a fishing reel comprised of a cylindrical housing for a rechargeable battery and a high-speed motor is directly coupled to a threaded shaft capable of holding an empty spool that is held in place by a conventional fastening means. In use, a loose end of the spent fishing line on the fishing reel is fastened to an empty spool, the reel and the spool aligned, and the device activated. The spent line is unwound from the rod reel making it ready for replacement in a conventional manner. The compacted spent line can be kept to be re-used later or discarded.

17 Claims, 5 Drawing Sheets

U.S. PATENT DOCUMENTS

2004/0035973 A1* 2/2004 Henrion ............... 242/390.8
2004/0232264 A1* 11/2004 Koelewyn et al. ......... 242/286
2010/0006692 A1* 1/2010 Galgano et al. ........... 242/588.4

* cited by examiner

FISHING REEL RE-WINDER

RELATED APPLICATIONS

The present invention was first described in and claims the benefit of U.S. Provisional Application No. 61/127,122 filed on May 12, 2008, the entire disclosures of which are incorporated herein by reference.

FIELD OF THE INVENTION

The present invention relates generally to fishing equipment and, more particularly, to a device for assisting in efficient and convenient fishing line reel unwinding and spool rewinding.

BACKGROUND OF THE INVENTION

Many fishermen enjoy the solitude and serenity of being alone on the water, although this solitude is disadvantageously accompanied by a lack of assistance performing tasks. Throughout the years, recreational fishermen have relied on the conventional rod and reel. As with anything mechanical, this equipment is prone to wearing out and failing, especially the fishing line which is regularly replaced with a new line or changed for an alternate type of line depending on the type of fishing being performed. The replacement line is stored on a spool and the fisherman must rewind the line from the spool to the fishing reel.

Various devices have attempted to assist the fisherman in rewinding the fishing reel when the fishing line is to be replaced when the assistance of another person is unavailable. These devices typically comprise a stable base portion having rods that accept and secure spools of fishing line which aid in the rewinding of the reels. Such examples include: U.S. Pat. Nos. 6,702,226, issued in the name of Bowling, which describes a device for aiding in the rewinding of a fishing reel and 5,322,236, issued in the name of Smith, which describes a fishing line spool holder. Other attempts to assist the fisherman in the reel winding and rewinding process include electrically driven reel devices. Such examples include: 7,086,622, issued in the name of Whaley, which describes a fishing reel winding arm adapter for winding a fishing line comprising an attachment drive member that allows an electric screwdriver to be connected to the winding arm to eliminate the need to manually wind the fishing line onto the reel; 7,073,740, issued in the name of Westhoff, which describes a motorized fishing reel actuating mechanism and rod assembly; 5,004,181, issued in the name of Fowles, which describes a cordless electric fishing reel; and 6,126,104, issued in the name of Kellerman, which describes an adapter for a fishing reel drive motor for connecting a hand-held power tool to an internal driving mechanism of the fishing reel for rapidly rewinding dispensed fishing line onto the reel.

Although these devices assist in the winding and rewinding of fishing line onto the reel of the fishing rod, they do not address the disadvantages in dealing with the spent or replaced fishing line. Typically, when a line requires replacement, the fisherman must pull the old line off of the reel an arm's length at a time. This lengthy process often results in a large, tangled pile of fishing line which inevitably has to be discarded. Many times the tangled line ends up as litter or in the bottom of a body of water where it forms a peril for aquatic life or humans that should come in contact with it.

Additionally, ornamental designs for fishing line accessories exist, particularly, U.S. Pat. No. D 376,190, issued in the name of Van Horn, Jr. et al., which describes a fishing line board. However, none of these designs are similar to the present invention.

While these devices fulfill their respective, particular objectives, each of these a reference suffers from one (1) or more of the aforementioned disadvantages. Accordingly, there is a need for a means by which old fishing line can be quickly removed from a fishing rod. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to efficiently remove fishing line from a fishing reel when it is in need of replacement in a manner that enables undamaged fishing line to be stored and reused or unwanted, spent fishing line to be discarded properly and thus, the object of the present invention is to solve the aforementioned disadvantages.

To achieve the above objectives, it is an object of the present invention to provide a fishing reel line re-winder that provides a means for the quick removal of spent fishing line from a fishing reel comprising a cylindrical housing and a high-speed motor that is directly coupled to a threaded shaft capable of holding an empty take up spool. The take-up spool is positioned upon the threaded shaft and the fishing line that is being removed from the fishing reel is wound onto the take up spool. The spent line is unwound from the fishing reel, thereby making it ready for replacement in a conventional manner.

Another object of the fishing line re-winder is to provide a device comprising a housing having front and rear housing elements, an internal battery compartment, a digit-actuated power switch, an electric motor and an output shaft.

Yet still another object of the fishing line re-winder is to provide a device comprising a threaded shaft that is attached to the output shaft of the motor having a drive pin located on the lower portion of the threaded shaft.

Yet still another object of the fishing line re-winder is to provide a device comprising a take-up spool having line accumulation gap that provides a recessed area for the collection of the spent fishing line, a center aperture for connecting the take-up spool to the threaded shaft, a drive pin groove that provides an engagement means between the take-up spool and the threaded shaft and transfers the rotational motion from the output shaft to the take-up spool, and a line locking groove that provides an engagement means between the spent fishing line and the take-up spool.

Yet still another object of the fishing line re-winder is to provide a device comprising a fastener that threadingly engages the threaded shaft and provides a means of tightening and securing the take-up spool to the threaded shaft and seated upon the drive pin.

Yet still another object of the fishing line re-winder is to provide a device comprising an alternate smooth shaft that is inserted through the center aperture of the take-up spool having at least two (2) spring-loaded locking tabs that retract as the take-up spool slides over the smooth shaft and deploy to an original position retain the take-up spool in a tight and secure position seated upon the drive pin.

Yet still another object of the fishing line re-winder is to provide a method of utilizing the device generally comprising the steps of acquiring the device and placing an empty take-up spool on the threaded shaft such that the drive pin engages the slot on the take-up spool and placing and tightening the fastener to retain the take-up spool on the threaded shaft. Next, the user secures the old fishing line from the fishing rod to the take-up spool by sliding it in the line locking groove and winding the old fishing line on to the take-up spool until the fishing line has been completely removed from the fishing reel. Finally, the user removes and discards the take-up spool with the old fishing line or stores the take-up spool with the old fishing line if the fishing line might be used again.

Yet still another object of the fishing line re-winder is to provide a method of utilizing the device which enables fishermen the ability to quickly remove fishing line in a manner which makes ecological disposal or re-use of the old line possible.

Further objects and advantages of the fishing line re-winder will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | fishing reel line re-winder |
| 20 | housing |
| 21 | front housing |
| 22 | rear housing |
| 30 | battery compartment |
| 32 | battery |
| 34 | power switch |
| 35 | motor |
| 36 | threaded shaft |
| 37 | drive pin |
| 39 | output shaft |
| 40 | take-up spool |
| 41 | line locking groove |
| 42 | drive pin groove |
| 43 | wing nut |
| 44 | accumulation gap |
| 51 | locking tab |
| 52 | smooth shaft |
| 55 | electrical wiring |
| 60 | fishing rod |
| 70 | fishing reel |
| 71 | fishing reel bale |
| 72 | fishing line |
| 100 | operator |

DETAILED DESCRIPTION OF THE PREFERRED EMBODIMENT

Figure 3:
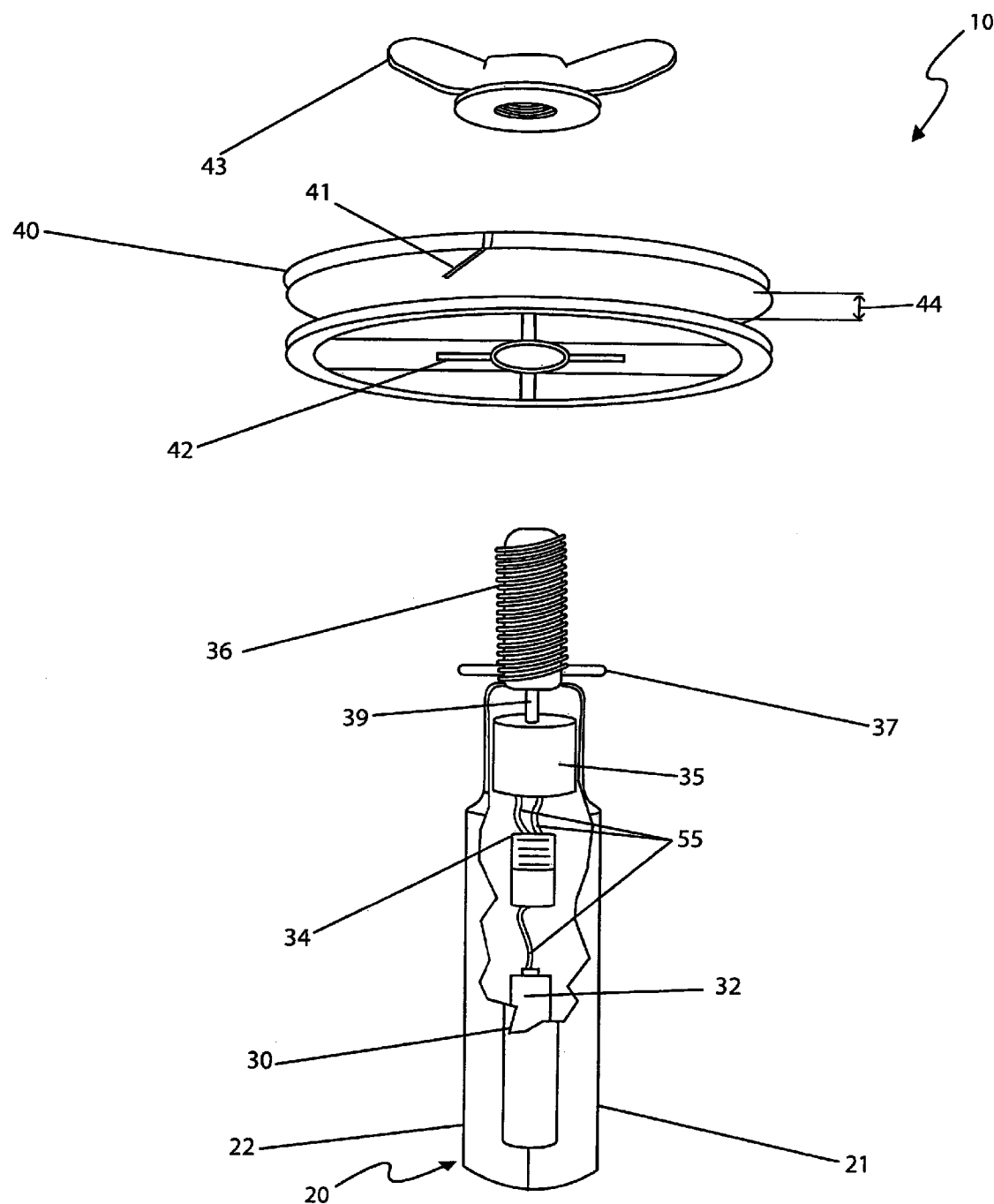
FIG. 3 is a partial cut-away exploded view of a fishing reel line re-winder 10, according to a preferred embodiment of the present invention.
Figure 4:
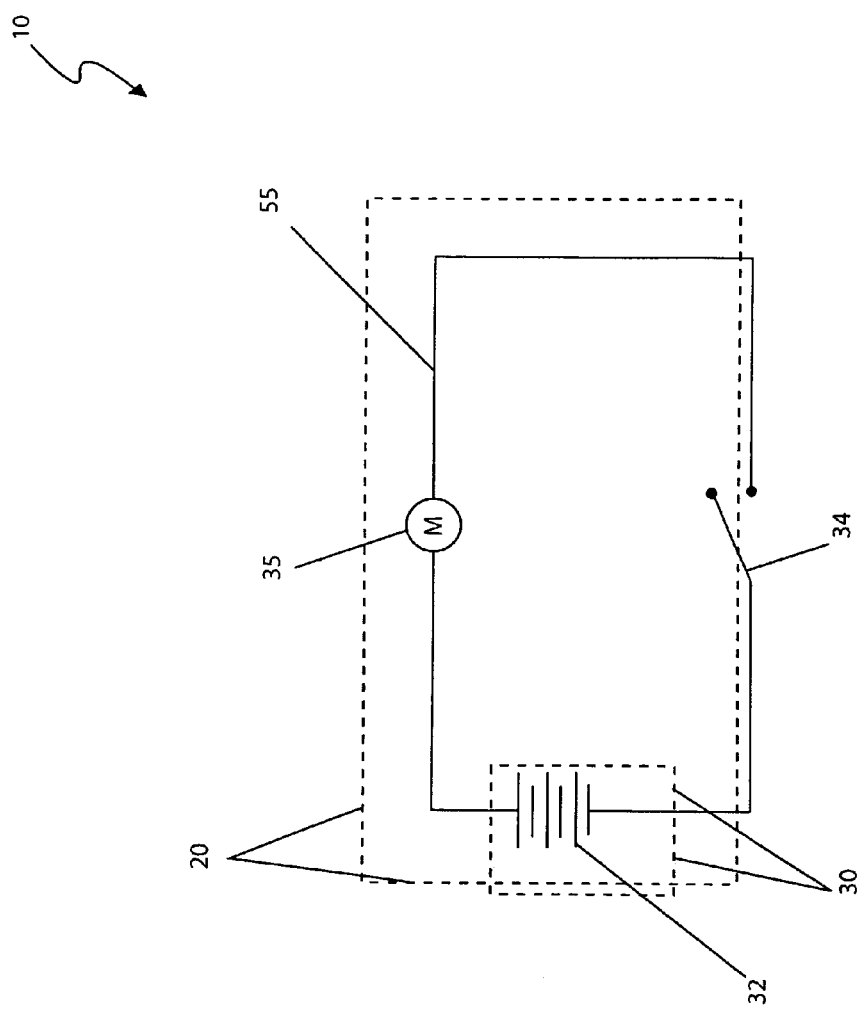
FIG. 4 is an electrical block diagram of a fishing reel line re-winder 10, according to a preferred embodiment of the present invention; and, FIG. 5 is a front perspective exploded view of a fishing reel line re-winder 10, according to an alternate embodiment of the present invention.
Figure 5:
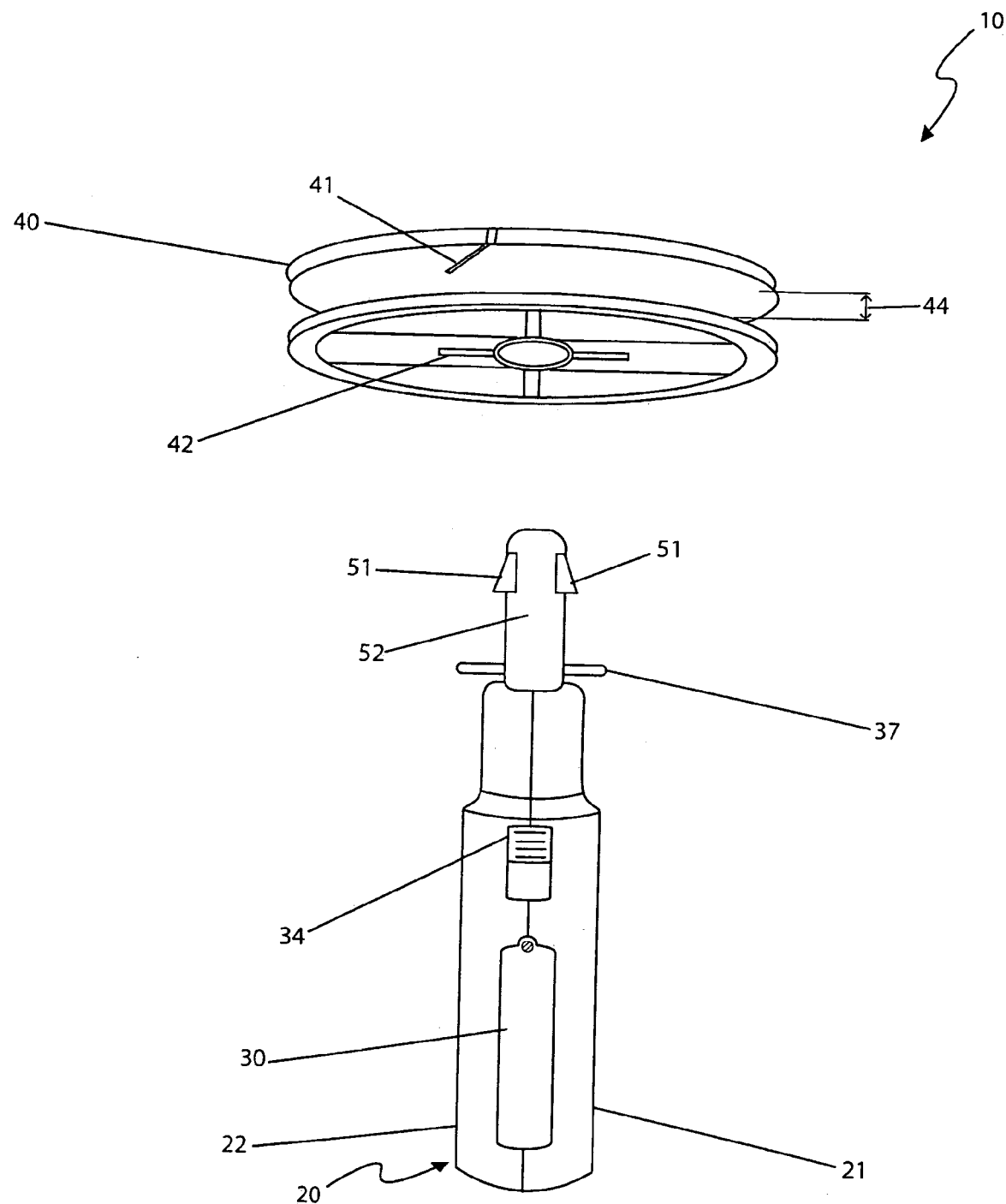

The best mode for carrying out the invention is presented in terms of its preferred embodiment, herein depicted within FIGS. 1 through 4, with an alternate embodiment depicted within FIG. 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fishing reel line re-winder (herein described as the "device") 10, which provides a means for the quick removal of spent fishing line 72 from a fishing reel 70. The device 10 is comprised of a cylindrical housing 20 for a rechargeable battery and a high-speed motor 35 directly coupled to a threaded shaft 36 capable of holding an empty take up spool 40 that is held in place by a conventional fastening system such as a wing nut 43. The device 10 allows an operator 100 the ability to not only remove line in a quick manner from fishing rods, but do so in a manner which makes ecological disposal or re-use of the old line possible.

Figure 1:
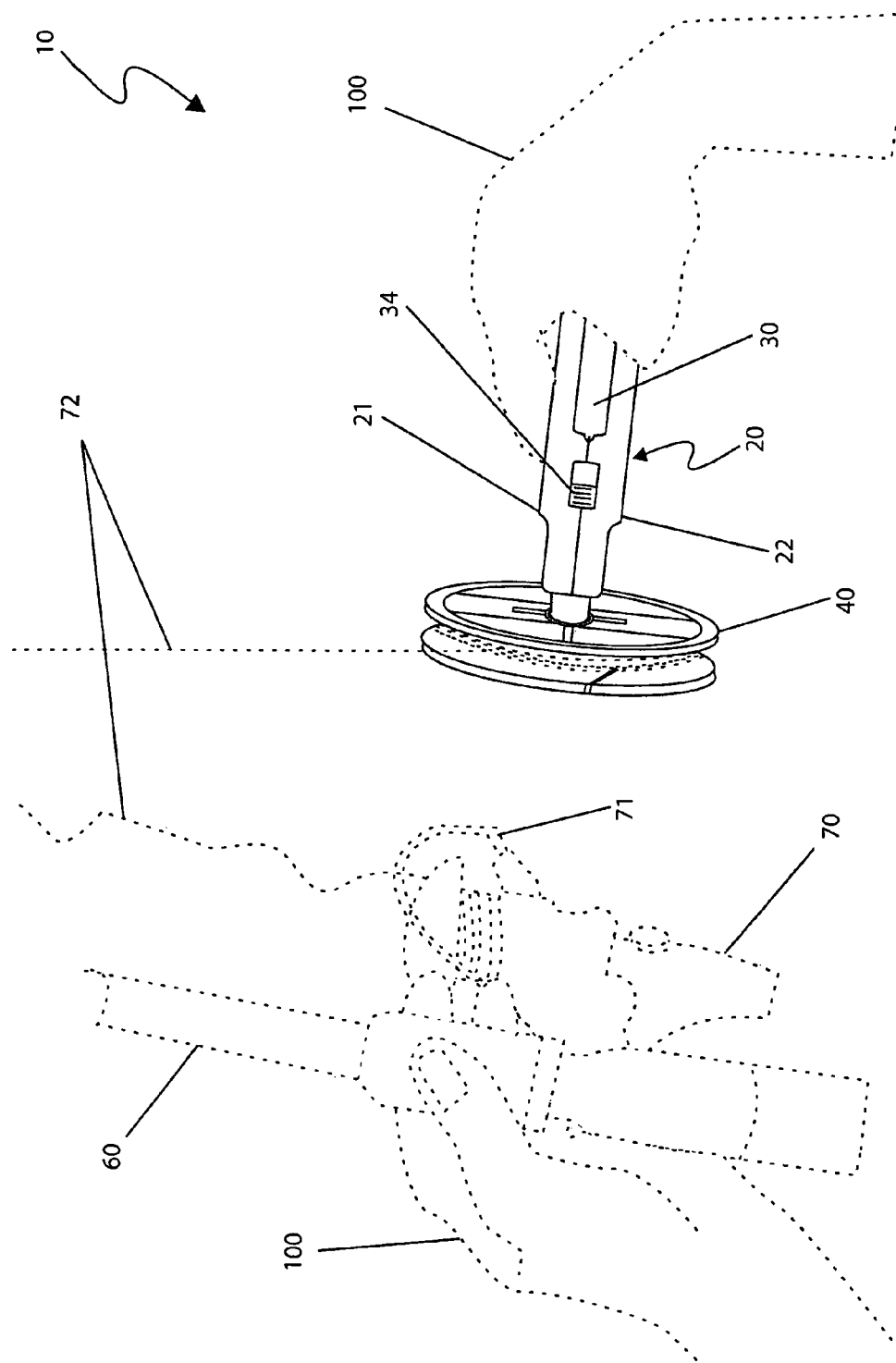
FIG. 1 is an environmental view of a fishing reel line re-winder 10, according to a preferred embodiment of the present invention.

Referring now to FIG. 1, an environmental view of the device 10, according to the preferred embodiment of the present invention, is disclosed. This view shows the device 10 in use with the take-up spool 40 positioned on the threaded shaft 36 and the fishing line 72 being removed from the fishing reel 70 and wound onto the take up spool 40. In use, a loose end of the spent fishing line 72 on the fishing reel 70 is fastened to the empty take-up spool 40, the reel 70 and the spool 40 aligned, and the device 10 is then activated. The spent line is unwound from the fishing reel 70, thereby making it ready for replacement in a conventional manner. The compacted spent fishing line 72 can be kept to be re-used later or discarded.

Figure 2:
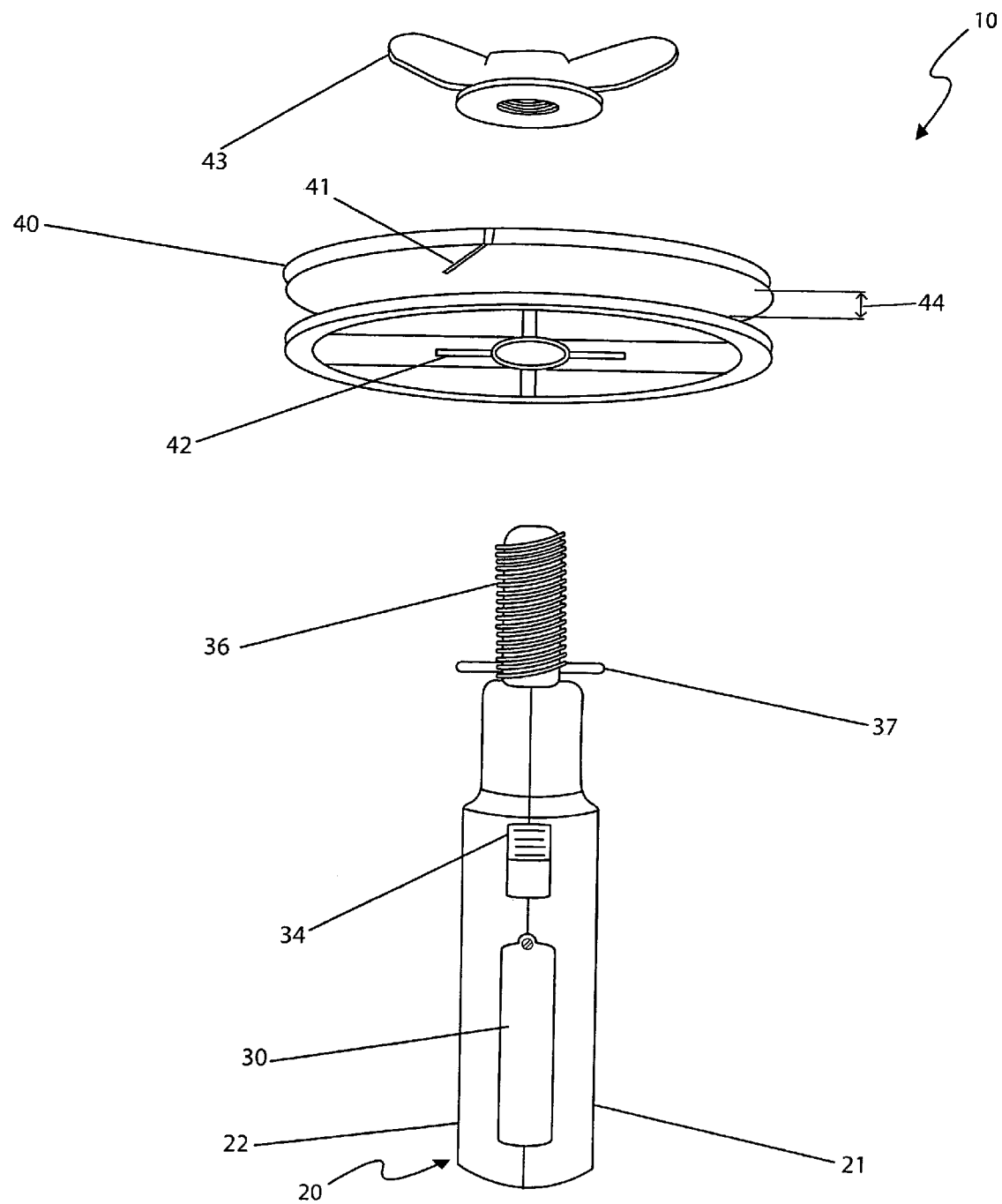
FIG. 2 is a front perspective exploded view of a fishing reel line re-winder 10, according to a preferred embodiment of the present invention.

Referring now to FIG. 2, a front perspective exploded view of the device 10 and FIG. 3, a partial cut-away exploded view of the device 10, according to the preferred embodiment of the present invention, are disclosed. The device 10 comprises a housing 20, a battery compartment 30, a power switch 34, a motor 35, a threaded shaft 36, a take-up spool 40, and a wing nut 43. The materials required to produce the device 10 are all readily available and well known to manufacturers of goods of this type.

The housing 20 is comprised of a front housing 21, a rear housing 22, the battery compartment 30, and the power switch 34, thereby providing access to internal components and providing a grippable digit operated section to the operator 100. The front housing 21 and the rear housing 22 are fastened together by means such as, but not limited to: locking tabs molded within each part that snap together, or by screws. The front housing 21 and the rear housing 22 would be molded plastic parts; however, other materials such as, but not limited to, steel or aluminum could also be used.

The battery compartment 30 is located on a lower portion of the housing 20 therebetween the rear housing 22 and the front housing 21. Said battery compartment 30 is preferably accessible with a common fastening means such as a screw, but other fastening means may be provided such as, but not limited to: an interference fit, locking knobs, or the like. Said battery compartment 30 provides an opening thereto preferably one (1) or more conventional replaceable or rechargeable batteries 32. The utilization of an operator replaceable battery 30 enables the operator 100 to transport the device to a desired location without limitations.

The power switch 34 provides a digit operated ON/OFF feature to the device 10, thereby allowing the operator 100 to control the motor 35. Said power switch 34 is located thereabove the battery compartment 30 and is connected to the battery 32 therewith electrical wiring 55. Said power switch 34 is preferably a sliding switch, yet other switching device such as, but not limited to: a toggle switch, a push button, or the like may be incorporated without limited the features of the device 10.

Internally the power switch 34 is connected to the motor 35 therewith electrical wiring 55, thereby controlling the operations of said motor 35. (also see FIG. 4). The motor 35 is comprised of a conventional electric motor 35 with a commonly attached output shaft 39. Other motors 35 may be provided such as, but not limited to: a servo motor, electrostatic motor, or the like without limiting the features of the device 10. The threaded shaft 36 is attached to the output shaft 39, thereby providing an attachment means to the take-spool 40. As the power switch 34 is positioned in an ON position current is supplied to the motor 35 which simultaneously causes the output shaft 39 and threaded shaft 36 to rotate.

The threaded shaft 36 comprises a drive pin 37, thereby providing an attachment to the circular take-up spool 40. The drive pin 37 is located thereon a lower portion of the threaded shaft and is attached to the threaded shaft 36 with fastening means such as, but not limited to: welding techniques, integral molding, or the like. The take-up spool 40 is installed thereon the threaded shaft 36 such that the integral drive pin groove 42 engages the drive pin 37, thereby assuring that the torque is transferred from the threaded shaft 36 to the take-up spool 40. A conventional wing nut 43, appropriately sized to fit the threaded shaft 36, is threadingly fastened onto the threaded shaft 35 after insertion into the take-up spool 40, thereby securing said take-up spool 40 onto the threaded shaft 35. The threaded shaft 36, the drive pin 37, and the wing nut 43, are fabricated from materials such as steel, aluminum, or a molded plastic construction.

The take-up spool 40 comprises an integral line locking groove 41, thereby providing a securing means to the fishing line 72 to the take-up spool 40 during use. The locking groove 41 is located thereon a lower section of the top portion of the take up spool 40. The take-up spool 40 also comprises an accumulation gap 44, thereby providing a fishing line 72 collection portion. Said accumulation gap 44 is located at an intermediate portion of the take-up spool 40 and is an appropriately sized space to retain an abundance of used fishing line 72. In use, the fishing line 72 is spun therearound the accumulation gap 44 and an end portion of the fishing line 72 is secured thereon the locking grove 41 when finished or as necessary. The take-up spool 40 could be either a custom-molded plastic part or a commercially available part, and the operator 100 may find many fishing line spools supplied with new fishing line will fit on the device 10, and once they are empty, they can be used in place of the take-up spool 40 on the device 10.

Referring now to FIG. 4, an electrical block diagram of the device 10, according to the preferred embodiment of the present invention, is disclosed. The device 10 comprises a battery 32, a power switch 34, a motor 35, and electrical wiring 55 which are enclosed within the housing 20. The battery 32 is accessed through the battery compartment 30 located thereon a lower portion of the housing 20. The battery 32 is preferably a conventional operator 100 replaceable battery 32, yet other electrical current producing means may be provided without limiting the functions of the device 10. Said battery 32 is interconnected to the power switch 34 and motor 35 with appropriately gauged electrical wiring 34. When the power switch 34 is placed in an operating position the motor 35 is triggered to rotate which in turn rotates the threaded shaft 36 or alternately the smooth shaft 52.

Referring now to FIG. 5, a front perspective exploded view of a fishing reel line re-winder 10, according to an alternate embodiment of the present invention, is disclosed. The alternate embodiment is similar to the preferred embodiment except that the threaded shaft 36 and wing nut 43 are replaced with a smooth shaft 52 which comprises a pair of spring-loaded locking tabs 51 to retain the take-up spool 40. As the smooth shaft 52 is inserted into aperture on the take-up spool 40 the locking tabs 51 retract thereinto said smooth shaft 52. Once the locking tabs 51 are completely through the aperture said locking tabs 51 deploy to an original position, thereby securing the take-up spool 40 onto the smooth shaft 52.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: acquiring the device 10; placing an empty take-up spool 40 on the threaded shaft 36; rotating the take-up spool 40 relative to the threaded shaft 36 while lightly pushing the take-up spool 40 further onto the threaded shaft 36 such that the drive pin 37 engages the slot on the take-up spool 40; placing the wing nut 43 onto the threaded shaft 36; tightening the wing nut 43 to retain the take-up spool 40 on the threaded shaft 36; securing the old fishing line 72 from the fishing rod 60 to the take-up spool 40 by sliding the end of the old fishing line 72 into the line locking groove 41; flipping the fishing reel bale 71 over to release the fishing line 72 on the fishing reel 70; holding the fishing rod in a first hand and the device 10 in a second hand and turning on the power switch 34 thereto rotate the motor 35 and threaded shaft 36; winding the old fishing line 72 on to the take-up spool 40; turning off the power switch 34 when the fishing line 72 has been completely removed from the fishing reel 70; removing the wing nut 43; removing the take-up spool 40 with the old fishing line 72; discarding the take-up spool 40 with the old fishing line 72 or storing the take up spool 40 with the old fishing line 72 if the fishing line might be used again; and, removing fishing line 72 from a fishing reel 70 in a timely manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A fishing reel line re-winder for removing a spent fishing line from a fishing reel, said fishing line re-winder comprising:
   a linear housing;
   a motor situated within said housing;
   a shaft coupled to said motor; and,
   a spool positioned about said shaft;
   wherein said spool is adapted to receive the spent fishing line on the fishing reel such that the spent fishing line is wound about said spool as said motor operates;
   wherein said shaft further comprises: a drive pin statically coupled to a proximal end of said shaft and removably interlocked with said spool such that said spool simultaneously rotates with said drive pin and said shaft during operating conditions;
   wherein said pin has diametrically opposed resilient and unitary rectilinear ends protruding radially outward from said shaft;
   wherein said shaft has a threaded outer surface extending along a major longitudinal length thereof.

2. The fishing line re-winder of claim 1, further comprising: a fastener removably connected to said shaft in such a manner that said spool and said fastener are caused to rotate synchronous with said shaft.

3. The fishing line re-winder of claim 1, wherein said housing comprises:
   a battery compartment;
   a power source situated within said battery compartment; and,
   a power switch electrically coupled to said power source.

4. The fishing line re-winder of claim 1, wherein said drive pin becomes directly coupled to said spool as said spool is linearly displaced about said shaft, said drive pin being located on a lower portion of said shaft and further being statically attached to said shaft.

5. The fishing line re-winder of claim 1, wherein said spool comprises: an integral drive pin groove formed therein and oppositely extending away from a center of said spool, said drive pin groove receiving said drive pin and thereby assuring that torque is transferred from said shaft to said spool.

6. The fishing line re-winder of claim 1, wherein said spool comprises: an integral line locking groove adapted to receive the spent fishing line, said locking groove being located on a lower section of a top portion of said spool, said spool further including an accumulation gap adapted to further receive the spent fishing line;
   wherein said accumulation gap is located at an intermediate portion of said spool and thereby adapted to uniformly receive the spent fishing line thereabout.

7. The fishing line re-winder of claim 1, wherein said shaft comprises: a plurality of spring loaded locking tabs frictionally engaged with said spool such that said spool remains statically mated to said shaft during rotation.

8. A fishing reel line re-winder for removing a spent fishing line from a fishing reel, said fishing line re-winder comprising:
   a cylindrical linear housing;
   a motor situated within said housing;
   a shaft directly coupled to said motor; and,
   a spool removably positioned about said shaft;
   wherein said spool is adapted to receive the spent fishing line on the fishing reel such that the spent fishing line is wound about said spool as said motor operates;
   wherein said shaft further comprises: a drive pin statically coupled to a proximal end of said shaft and removably interlocked with said spool such that said spool simultaneously rotates with said drive pin and said shaft during operating conditions;
   wherein said pin has diametrically opposed resilient and unitary rectilinear ends protruding radially outward from said shaft;
   wherein said shaft has a threaded outer surface extending along a major longitudinal length thereof; and,
   wherein said spool is provided with first and second discs each having first and second uniform diameters respectively, wherein said first and second diameters remain constant along an entire corresponding length of said first and second discs respectively.

9. The fishing line re-winder of claim 8, further comprising: a fastener removably connected to said shaft in such a manner that said spool and said fastener are caused to rotate synchronous with said shaft.

10. The fishing line re-winder of claim 8, wherein said housing comprises:
    a battery compartment;
    a power source situated within said battery compartment; and,
    a power switch electrically coupled to said power source.

11. The fishing line re-winder of claim 8, wherein said drive pin becomes directly coupled to said spool as said spool is linearly displaced about said shaft, said drive pin being located on a lower portion of said shaft and further being statically attached to said shaft.

12. The fishing line re-winder of claim 8, wherein said spool comprises: an integral drive pin groove formed therein and oppositely extending away from a center of said spool, said drive pin groove receiving said drive pin and thereby assuring that torque is transferred from said shaft to said spool.

13. The fishing line re-winder of claim 8, wherein said spool comprises: an integral line locking groove adapted to receive the spent fishing line, said locking groove being located on a lower section of a top portion of said spool, said spool further including an accumulation gap adapted to further receive the spent fishing line;
    wherein said accumulation gap is located at an intermediate portion of said spool and thereby adapted to uniformly receive the spent fishing line thereabout.

14. The fishing line re-winder of claim 8, wherein said shaft comprises: a plurality of spring loaded locking tabs frictionally engaged with said spool such that said spool remains statically mated to said shaft during rotation.

15. A method of utilizing a fishing reel line re-winder for removing a spent fishing line from a fishing reel, said method comprising the steps of:
    providing said fishing reel line re-winder, further comprising:
    a linear housing;
    a motor situated within said housing;
    a battery compartment;
    a power source situated within said battery compartment;
    a power switch electrically coupled to said power source;
    a shaft coupled to said motor; and,
    a spool positioned about said shaft;
    wherein said spool is adapted to receive the spent fishing line on the fishing reel such that the spent fishing line is wound about said spool as said motor operates;

wherein said shaft further comprises: a drive pin statically coupled to a proximal end of said shaft and removably interlocked with said spool such that said spool simultaneously rotates with said drive pin and said shaft during operating conditions;

wherein said pin has diametrically opposed resilient and unitary rectilinear ends protruding radially outward from said shaft;

wherein said shaft has a threaded outer surface extending along a major longitudinal length thereof;

wherein said spool comprises: an integral drive pin groove formed therein and oppositely extending away from a center of said spool, said drive pin groove receiving said drive pin and thereby assuring that torque is transferred from said shaft to said spool;

placing said spool on said shaft;

rotating said spool relative to said shaft while pushing said spool further onto said shaft such that said drive pin engages said drive pin groove on said spool;

obtaining and placing a fastener onto said shaft; and, tightening said fastener to retain said spool on said shaft.

16. The method of claim 15, further comprising the steps of:

securing the spent fishing line to the spool by sliding an end of the spent fishing line into a line locking groove of said spool;

flipping a bale of the fishing reel over to release the spent fishing line;

holding a fishing rod in a first hand and the fishing reel line re-winder in a second hand; and, winding the spent fishing line on to said spool by rotating said spool.

17. The method of claim 16, further comprising the step of: when the spent fishing line has been completely removed from the fishing reel, removing the fastener.

* * * * *